R. SIMPSON.
Stove Door.
No. 55,020.
Patented May 22, 1866.
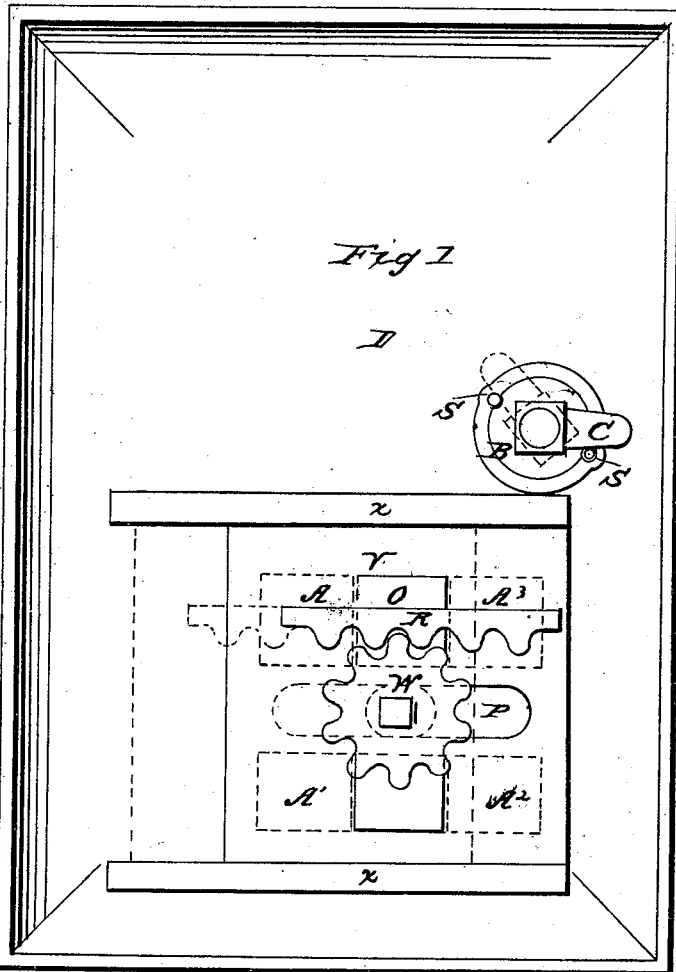
Fig. 1
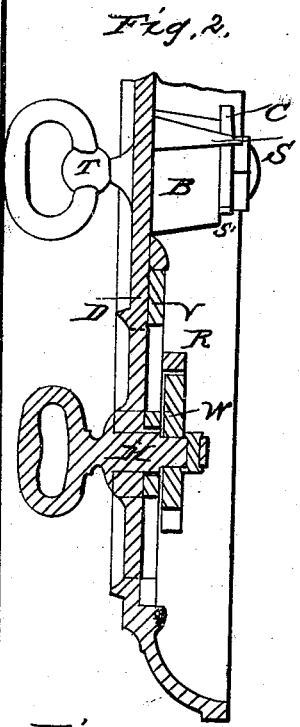
Fig. 2.
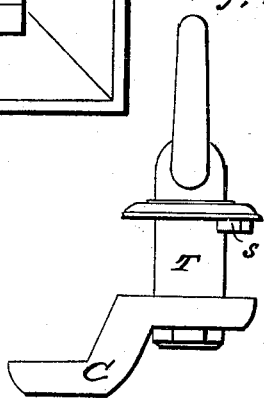
Fig. 3.
Fig. 4.
Witnesses:
Inventor
Robert Simpson

UNITED STATES PATENT OFFICE.

ROBERT SIMPSON, OF BOSTON, MASSACHUSETTS, ASSIGNOR TO JOSEPH PRATT AND CHARLES C. WENTWORTH, OF SAME PLACE.

IMPROVEMENT IN STOVE-DOORS.

Specification forming part of Letters Patent No. 55,020, dated May 22, 1866.

*To all whom it may concern:*

Be it known that I, ROBERT SIMPSON, of Boston, in the county of Suffolk and State of Massachusetts, have invented a new and useful Improvement in Doors for Stoves; and I do hereby declare that the following is a full, clear, and exact description of the construction and operation of the same, reference being had to the accompanying drawings, forming a part of this specification, in which—

Figure 1 is an elevation of the interior of the door; Fig. 2, a vertical section of said door. Figs. 3 and 4 are varieties of the turn-buckle, is sufficient to enable others skilled in the art to make and use my invention without other invention or discovery.

D is the door of a stove, having a sliding valve or damper, V, to regulate the supply of air to the fire-box. In Fig. 1 this damper is supposed to be closed, and the dotted lines at A A' $A^2$ $A^3$ represent the openings through the door, but now closed by damper V. On sliding the damper back apertures $A^2$ $A^3$ are uncovered by the removal of the damper and apertures A' A are uncovered by their coincidence with the opening O of the damper.

This damper is operated by a shaft, H, passing through the door, Fig. 2, and having a thumb-piece, as represented. Said shaft passes also through the slot P of the damper, and carries a pinion, W, operating a rack, R, fastened to the interior of the damper. The damper moves back and forth in guide-bars X cast on the interior of the door.

In the usual method of fastening stove-doors by a turn-buckle it frequently happens that the turn-buckle is turned round too far and jambs or fixes so as to cause difficulties and delays. I obviate this by placing two stops on the boss, through which the turn-buckle passes, so that the turn-buckle cannot pass beyond a given point either way.

In Figs. 1 and 2, B is the boss. T is the turn-buckle passing through the same, with its catch c. Said boss is provided with stops s or projections striking against the catch itself, or against a stop on the catch, as in Fig. 3, or against a stop on the turn-buckle, as in Fig. 4, and are so arranged as to allow no more motion to the catch than is necessary to free it when locked or to lock it when free.

What I claim as my invention, and desire to secure by Letters Patent, is—

1. The arrangement, in combination with the door D, of the guide-bars X, damper V, rack R, pinion W, and its shaft H, passing through slot P of the damper, substantially as described.

2. The arrangement, in combination with door D, of the turn-buckle T, boss B, and stops s, substantially as described, and for the purpose stated.

ROBERT SIMPSON.

Witnesses:
THOS. WM. CLARKE,
L. B. GAYLORD.